March 3, 1953   D. L. SCHWARTZ ET AL   2,630,383
METHOD OF MAKING A POROUS SINTERED CARBIDE TOOL
Filed April 26, 1950   2 SHEETS—SHEET 2

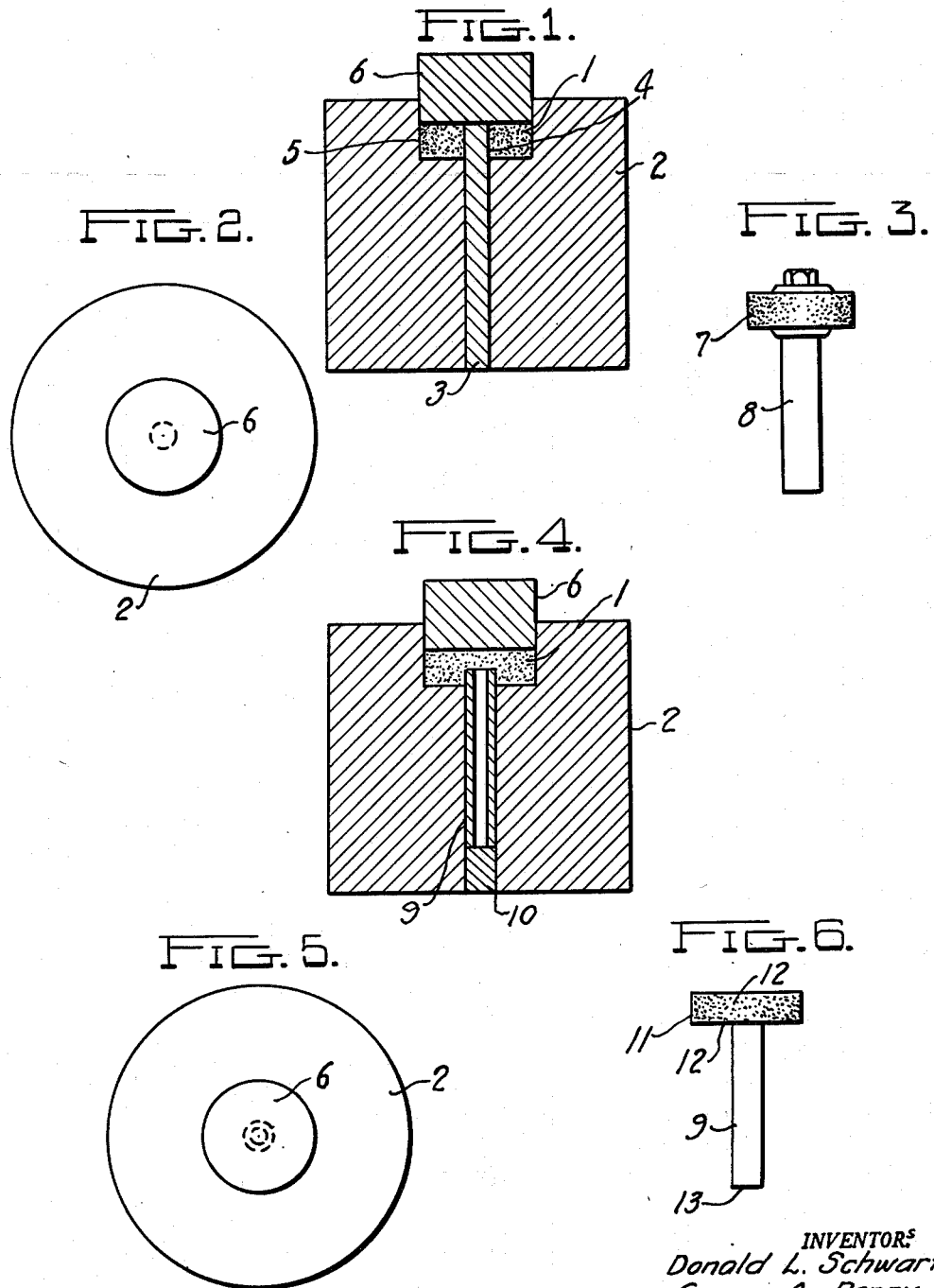

INVENTOR.
Donald L. Schwartz
BY George A. Perry

Barnes, Kisselle, Laughlin & Raisch
ATTORNEYS

UNITED STATES PATENT OFFICE 2,630,383

METHOD OF MAKING A POROUS SINTERED CARBIDE TOOL

Donald L. Schwartz, Detroit, and George A. Perry, Royal Oak, Mich., assignors to General Electric Company, a corporation of New York Application April 26, 1950, Serial No. 158,318

1 Claim. (Cl. 75—203)

This invention relates to a tool of sintered crushed cemented carbide granules. More particularly it relates to a tool made from cemented carbide which has been previously sintered and crushed into granules, which tool is useful for such purposes as drilling dental enamel, glass, masonry, ceramics and metal, and for grinding similar materials.

The present application is a continuation in part of our prior application, Serial 741,254, filed April 14, 1947, now abandoned.

Our product is characterized by sintered granules of crushed cemented carbide of irregular shape which are bonded together at their points of contact and afford a multiplicity of cutting points positioned throughout the surface of the tool. It is these cutting points which do the work and actually cut into the surface being operated upon regardless of whether this operation be characterized as grinding, drilling, abrading, cutting or burring. Such tool will maintain its cutting edge for a considerably longer period than tools now in use for comparable purposes.

In the drawings,

Fig. 1 is a sectional view showing the apparatus used for forming a grinding wheel of sintered granules of crushed cemented carbide.

Fig. 2 is a top plan view of this apparatus.

Fig. 3 is an elevation showing our grinding wheel mounted upon a solid shank.

Fig. 4 is a sectional view showing the dies used in forming our grinding wheel with a hollow shank.

Fig. 5 is a top plan view of the dies shown in Fig. 4.

Fig. 6 is an elevation of our grinding wheel with a hollow shank.

Cemented tungsten carbide, that is, a sintered, compact, hard metal composition of tungsten carbide with a metal of the iron group as a binder is old and well known. Numerous methods for producing cemented tungsten carbide are known and in use. Among these methods are those taught by any one of the following United States patents which are incorporated into and made a part of this specification: Schroter Re. 17,624, Schroter 1,721,416, Strauss 1,812,811, Hoyt 1,843,768. Such sintered, hard metal compositions sometimes include also either or both titanium carbide and tantalum carbide as minor components and tungsten carbide as the major component, and an iron group binder, preferably cobalt, in an amount up to 20% by weight.

Figure 12:
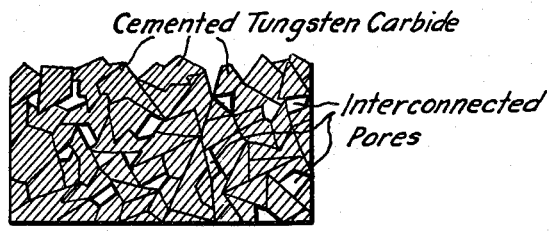
Fig. 12 is an illustrative showing of the sintered, sharp pointed granules of crushed cemented carbide from which our tool is made.

In the practice of the present invention, the cemented carbide starting material is made in substantial accordance with the teaching of Strauss U. S. 1,812,811 wherein the size of the carbide and the cobalt particles are not individually larger than approximately 10 microns. The cemented carbide thus made is an imporous, hard, sound material and is reduced by crushing to sharp, irregular granules, such as illustrated in Fig. 12. These crushed irregular granules are then screened to a size ranging between about 20 mesh to about 325 mesh. The selected granules which may be any combination of sizes between approximately 20 mesh and approximately 325 mesh are then placed in a mold and compacted by vibration or by the application of pressure on the order of 50 p. s. i. to 1000 p. s. i. The compact density that is obtained by either of these methods of compacting is limited to a minimum of approximately 40% voids due to the fact that the hard irregular granules tend to lock together in such a manner as to substantially preclude further compaction. The compacted granules are subsequently resintered by heating to a temperature substantially the same as the original sintering temperature, for example, approximately 1300° C. to approximately 1500° C.; the exact sintering temperature within this approximate range is generally determined by the percentage of cobalt which is present, with higher percentages of cobalt requiring relatively lower temperatures and lower percentages of cobalt requiring relatively higher temperatures. The compact is maintained at the resintering temperature for approximately 5 to 35 minutes and during the resintering no pressure is applied to the compact.

Each granule as crushed and selected has the typical grain structure of a hard, sound imporous cemented carbide; that is, a photomicrograph of the granule would show numerous extremely fine particles of carbide having a size range from between approximately one-half micron to approximately 10 microns interspersed in and surrounded by the iron group binder cobalt. As a result of sintering in accordance with the teaching of Strauss U. S. 1,812,811 the crushed carbide granules have undergone the normal sintering shrinkage and a resintering at approximately the original sintering temperature will not cause any further appreciable shrinkage unless the sintered material is again reduced to comparable particle size to that of the original finely powdered material, not larger than approximately 10 microns. It will be appreciated that when the sintered carbide is ground to a fine powder that the particles lose the characteristics of a sintered cemented carbide material. This is not true however of the granules which are selected to form the tool which is the subject matter of our invention. The selected granules having a size from about 20 mesh to about 325 mesh on resintering at approximately the original sintering temperature bond together at their points of contact only and retain their identity as discrete hard imporous granules of cemented carbide and have substantially the same size that they had prior to resintering. The resulting product is a porous tool comprised of irregularly shaped imporous hard selected carbide granules which are bonded together at their points of contact only and which has a minimum porosity of approximately 25% and a maximum porosity of approximately 60%.

In accordance with the present invention, tools have been advantageously fabricated by the herein described process with cemented carbide granules consisting of 97% to 76% tungsten carbide, 0 to 12% of titanium carbide and 0 to 4% tantalum carbide, the total carbide content of the granules being not less than 84%, and 3% to 16% cobalt, and more particularly the following specific compositions have been used:

*Example 1*

| | Percent |
|---|---|
| Tungsten carbide | 97 |
| Cobalt | 3 |

*Example 2*

| | |
|---|---|
| Tungsten carbide | 94 |
| Cobalt | 6 |

*Example 3*

| | |
|---|---|
| Tungsten carbide | 87 |
| Cobalt | 13 |

*Example 4*

| | |
|---|---|
| Tungsten carbide | 84 |
| Cobalt | 16 |

*Example 5*

| | |
|---|---|
| Tungsten carbide | 76 |
| Cobalt | 8 |
| Titanium carbide | 12 |
| Tantalum carbide | 4 |

*Example 6*

| | |
|---|---|
| Tungsten carbide | 85 |
| Cobalt | 10 |
| Titanium carbide | 4 |
| Tantalum carbide | 1 |

*Example 7*

| | |
|---|---|
| Tungsten carbide | 82 |
| Cobalt | 10 |
| Titanium carbide | 8 |

In making a grinding wheel the crushed cemented carbide granules 1 are positioned at random in a graphite mold 2 provided with a graphite plug 3 which forms the center hole 4 in the finished wheel. The crushed carbide granules are poured into cylindrical opening 5 in mold 2. A graphite leveling plug 6 is then positioned in the mold upon granules 1. The granules are then compacted by tapping the side of the mold or by vibrating the mold or applying slight pressures on the order of 50 p. s. i. to 1000 p. s. i., and then sintered together at their points of contact only at a suitable temperature falling within a range of from about 1200° C. to about 1600° C. and preferably between about 1300° C. and about 1500° C. The sintered grinding wheel is designated 7 and is mounted upon a shaft 8 in a conventional manner. The abrasiveness of the wheel 7 and the degree of fluid permeability thereof will depend upon the size of the granules 1, the manner in which the granules are distributed and the temperature at which the granules are sintered.

For example, when using the composition of Example 2, and granules that will pass screen mesh 20 and be retained on screen mesh 50, and sintering at 1450° C. for approximately 5 to 35 minutes, we obtain a tool having a coarse abrasive action. If however, we employ the same compostion, but employ granules that will pass screen mesh 250 and be retained on screen mesh 325, and sinter at the same temperature for a like period of time, we obtain a tool having a much finer abrasive action. Furthermore by selecting varying proportions of large and fine granules, we can increase or decrease the degree of fluid permeability of the resulting tool between about 25% voids as a minimum and 50 to 60% as a maximum.

The minimum porosity of our tool is approximately 25% and this is achieved by utilizing a mixture of granule sizes between 20 screen mesh and 325 screen mesh with the smaller granules being present in predominating amount; the maximum porosity is about 60% and is achieved by using granules between 20 screen mesh and 30 screen mesh.

Wheel 7 will be fluid permeable. The permeability of the wheel is particularly useful when it is desired to supply a coolant, such as water or air, to the surface being ground. The pores existing between the granules of cemented tungsten carbide are interconnected, as illustrated in section in Fig. 12, to thereby make the wheel water or fluid permeable.

The method of fabricating a permeable wheel through which a liquid or gaseous coolant can be directed is illustrated in Figs. 4 to 6. The method used is the same as that shown in Figs. 1 to 3 except that a hollow shaft or shank 9 is substituted for the graphite plug 3. The hollow shank 9 can be made from any suitable material, preferably metal, such as tungsten, molybdenum, cemented tungsten carbide, or other alloy which will not melt or warp at sintering temperature, and is inserted in the carbide granules 1 before sintering, as illustrated in Fig. 4. The shank is backed up by a graphite locating plug 10. During the sintering of the particles at the above specified temperature the shank 9 becomes bonded to the finished wheel 11. To direct the flow of coolant to the periphery of the wheel, the sides 12 of the wheel are impregnated with a metal such as solder or brass or an organic plastic resin or material which forms a bond with the side faces of the wheel. The depth of penetration of the impregnating metal or plastic is only sufficient to make the side faces 12 of the wheel waterproof. Water or other coolant from a suitable source will be admitted into the end 13 of shank 9 and the speed of rotation of wheel 11 will cause wheel 11 to act somewhat in the nature of a centrifugal pump, that is, the centrifugal force will expel the water from the circumferential face of wheel 11 and thereby continuously draw more coolant through shank 9 toward the center of wheel 11 and then expel the same radially out through the circumferential or working face of the wheel. Thus, the coolant can be supplied to the inlet end 13 of shank 9 at a relatively low pressure and at higher wheel speeds the coolant can be supplied at the inlet end 13 under lower pressures. The permeability of the wheel also affects the amount of coolant which is drawn through wheel 11 by centrifugal force but if the permeability is too low to obtain the desired flow of coolant by centrifugal action, then, of course, the coolant can be supplied under pressure through shank 9.

Our grinding wheel is particularly well suited for grinding ceramics but is also useful in grinding metal. However, when grinding metal sufficient coolant should be supplied to keep the temperature of the metal piece being ground below that at which smearing of the metal upon the wheel would result.

A grinding wheel fabricated as above described has many advantageous features. Due to the hardness and toughness of the wheel, it will break down slowly. The centrifugal pumping of the wheel provides coolant at the point of cutting which prevents chipping and the cleansing action of the outward flow of coolant prevents the wheel from loading up with the substance being ground. This wheel will have a long life and also a fast cutting action.

Honing, lapping and super-finishing blocks can also be made as above described. Such blocks, of course, will be made from the finer cemented carbide granules selected from within the above specified range. Honing blocks of this type are very useful in the final finishing of the pistons and bearings.

Figure 7:
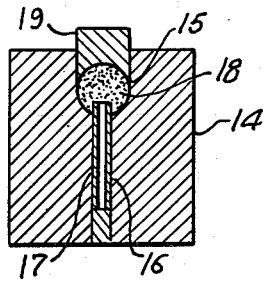
Fig. 7 is a sectional view showing the dies used in fabricating our dental burr.
Figure 8:
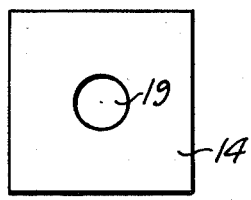
Fig. 8 is a top plan view of the dies shown in Fig. 7.
Figure 9:
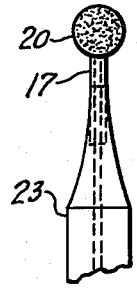
Fig. 9 is an elevation of the completed burr.
Figure 10:
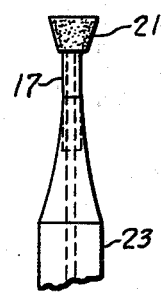
Figs. 10 and 11 are elevations of modified forms of our dental burr.
Figure 11:
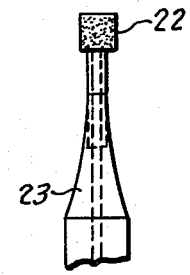

A dental burr is another type of tool which can be made from granules of crushed cemented carbide. The method used for making a dental burr is substantially the same as that used for making a grinding wheel. A graphite mold 14 will be prepared with a cavity 15 depending upon the geometric shape of the burr desired. The mold 14 will have a bore 16 to accommodate a hollow shank 17 which can be made of steel or any other suitable metal. The crushed cemented carbide granules 18 made by any of the methods above referred to and having a grain size within a range of from about 20 mesh to about 325 mesh are positioned in the mold cavity 15 and a locating plug 19 positioned in cavity 15 over the cemented carbide granules 18. Tube 17 will project into the mass of cemented carbide granules 18. The granules will be compacted slightly by tapping the side of the mold or by applying pressure on the order of 50 p. s. i. to 1000 p. s. i. to the leveling plug 19 and then sintered together and to the hollow tube 17 at a temperature falling from within a range of about 1300° C. to about 1500° C. As shown in Fig. 9, the finished burr 20 is in the form of a sphere. In Fig. 10 the burr is in the form of a truncated cone 21, and in Fig. 11 the burr is in the form of a cylinder 22. The finished burr is mounted upon a hollow steel shank 23 through which water or any other suitable fluid coolant can be passed. Shank 17 can be made from any suitable material which will not melt or warp at sintering temperatures and preferably this material is a metal or alloy such as tungsten, molybdenum, or cemented tungsten carbide.

The following exemplifies the performance given by a burr made as above described: a burr made as above described of granules having a size between 100 and 200 mesh sintered at 1465° C. was used to bore holes through a slab of marble ¼ inch thick, a sheet of Pyrex glass ⅛ inch thick, and a sheet of fused quartz ⅜ inch thick.

After these holes were bored, the burr was still in excellent cutting condition and the loss in size of the burr was inconsequential.

A fluid permeable carbide dental burr made as above described has many advantages over the currently used types of steel burrs. Our type of dental burr allows the application of coolant through the body of the burr during grinding or cutting which reduces pain otherwise caused by heat generated by the drilling operation. The time of grinding or drilling is appreciably decreased because of the higher speeds made possible by heat reduction. The fast cutting action of our dental burr is due to the multiplicity of the cutting points present on the irregular shaped cemented carbide granules exposed on the burr's surface, as illustrated in Fig. 12. Our burr has a much longer life than a steel burr and is produced at a relatively low cost. The application of the coolant which passes out through the porous burr and over its entire area continuously washes away the excess abraded material and keeps the drill clean. When drilling ceramics, glass or masonry the coolant thus applied at the point of cutting prevents chipping.

Our tool of sintered granules of cemented carbide is fluid permeable and thus differs from non-permeable material which could be produced for example by using a higher sintering temperature than for the permeable material together with the application of considerable pressure during sintering and by adding additional iron group metal in an amount sufficient to fill the voids.

The shank for our tool is preferably molded in place but can be secured to the grinding wheel or burr by any suitable connection.

We claim:

A method of making a porous sintered carbide tool which comprises the steps of sintering a mixture of 76% to 97% powdered tungsten carbide, 0% to 12% powdered titanium carbide, 0% to 4% powdered tantalum carbide and 3% to 16% cobalt, crushing said sintered mixture into irregularly shaped granules of a size falling within a range of from about 20 mesh to about 325 mesh, the total carbide content of each granule being not less than 84%, compacting said granules into a porous body having a minimum of about 40% voids by applying pressure of from about 50 p. s. i. to about 1000 p. s. i., removing the pressure and thereafter sintering said body of granules at a temperature falling within a range of from about 1300° C. to about 1500° C. so as to produce a porous tool having a minimum porosity of 25%.

DONALD L. SCHWARTZ.
GEORGE A. PERRY.

REFERENCES CITED

The following references are of record in the file of this patent:

UNITED STATES PATENTS

| Number | Name | Date |
| --- | --- | --- |
| 500,561 | Carpenter | July 4, 1893 |
| 1,721,416 | Schroter | July 16, 1929 |
| 1,800,122 | Voigtlander et al. | Apr. 7, 1931 |
| 2,040,592 | Becker | May 12, 1936 |
| 2,167,516 | Kelley | July 25, 1939 |
| 2,170,433 | Schwarzkopf | Aug. 22, 1939 |
| 2,193,413 | Wright | Mar. 12, 1940 |
| 2,334,755 | Eglinton | Nov. 23, 1943 |
| 2,404,598 | Sachse | July 23, 1946 |
| 2,413,084 | Sommer et al. | Dec. 24, 1946 |
| 2,435,227 | Lester | Feb. 3, 1948 |